Patented Nov. 23, 1926.

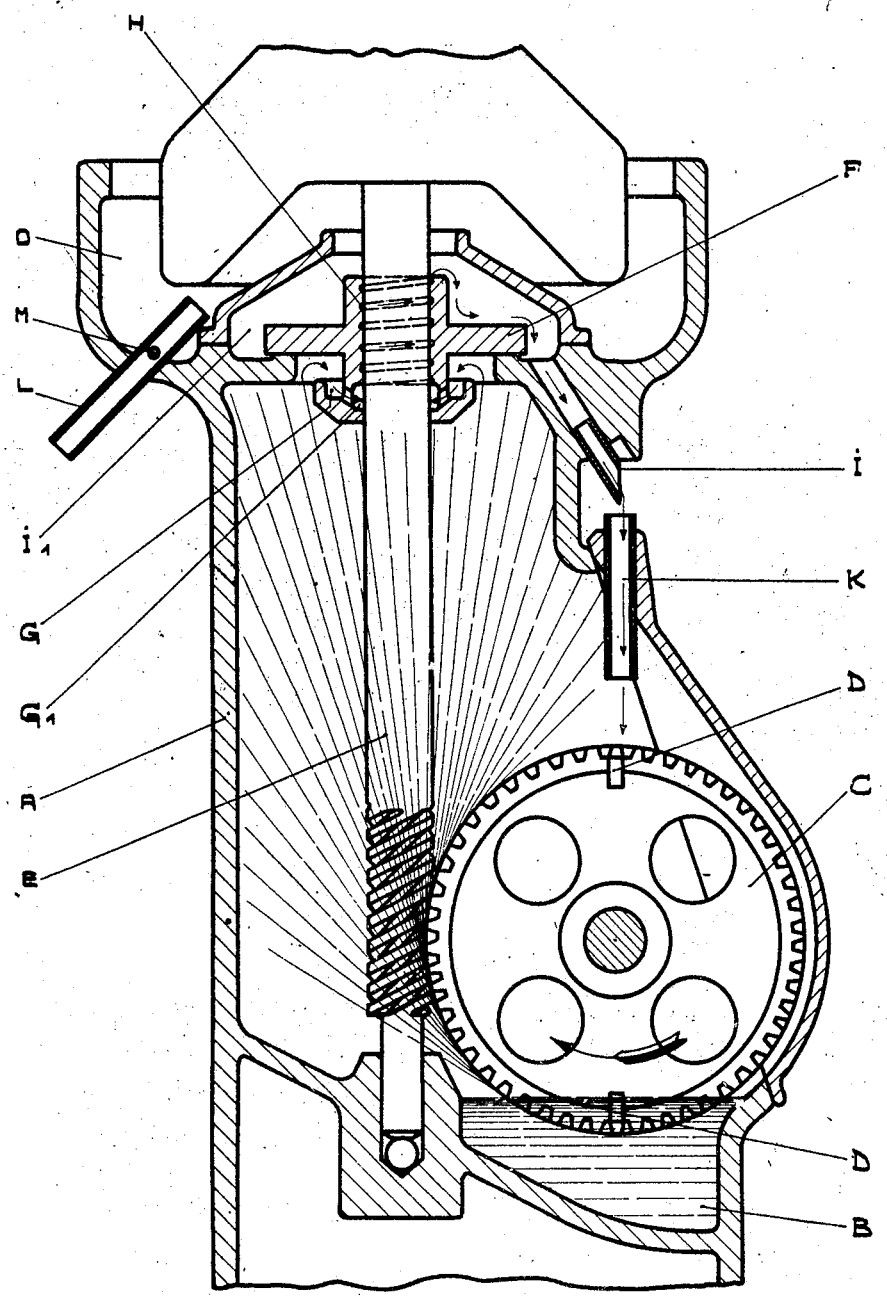

1,608,413

UNITED STATES PATENT OFFICE.

FRANTZ MORTENSEN, OF HELSINGFORS, FINLAND.

LUBRICATING RAPIDLY-REVOLVING SPINDLES.

Application filed March 17, 1923. Serial No. 625,922, and in Germany August 19, 1922.

In modern constructions of cream separators attempts have been made to obtain the best possible lubrication, and it has preferably been so arranged that the lubrication is made automatically from one oil receiver. Difficulties have, however, been experienced in obtaining a thorough oiling of the neck-bearing inasmuch as the oil has to be lifted from the oil receiver to the neck bearing, and on account of the considerable distance between these two the oil frequently fails to satisfactorily reach the neck-bearing.

The object of the present invention is to overcome some difficulties and provide for efficient lubrication of the neck-bearing.

The invention consists in providing means for conveying an ample supply of lubricant to an upper neck-bearing, means for facilitating the passage of the lubricant therethrough and means for returning the lubricant to the source of supply.

The invention further consists in arranging on the worm wheel or on any other revolving part certain agitators which cause the oil in the oil receiver to splash to quite considerable heights; the oil will thus safely reach the neck-bearing and may by means of spiral grooves be circulated therethrough.

The invention further renders it possible to ascertain that the oil is properly circulated through the neck-bearing inasmuch as the oil after having passed through the neck-bearing is arranged to flow to the outside of the machine and it may be so arranged that the amount of oil pasing through may be controlled after it has passed through the bearing.

The invention further makes it possible to adjust the air pressure or suction round the neck-bearing or at the point where the oil leaves the spindle bearing in order to return to the oil bath.

The accompanying drawing shows by way of example a convenient embodiment of the invention.

In the construction shown in the drawing A is a separator frame and B is an oil container situated in the bottom of a compartment containing the driving gear.

C is a worm wheel for driving the spindle, said worm wheel being fitted with agitators or throwers D adapted during revolution of the wheel to effectually throw oil to the upper part of the casing.

E is a vertical separator spindle passing through the neck-bearing F which is fitted at its lower end with a tray or dish collector G from which the oil passes into an annular chamber $G^1$ surrounding the bottom of the bearing and from which are carried one or more spiral grooves H formed in the bearing material and adapted during revolution of the spindle to circulate the oil in an upward direction through the bearing.

The oil flowing from the top of the bearing is carried by a passage $I^1$ and pipe I outside the casing to a position where it may be conveniently observed and from the pipe I the oil flows into a return conduit K which conducts the oil back into the container B in the bottom of the casing.

By means of the air-pipe L it is possible to adjust the air-pressure or suction near the spindle bearing and this is done by pressing the pipe further into the bowl house O or by bringing it outwards so that a shorter piece of pipe protrudes into the bowl house O. Thereby it is possible to regulate the oilflow so that the oil will not be sucked into the bowl house O and also to prevent an air-pressure which will tend to hamper the oil-flow. The pipe may conveniently have a hole M for waste milk or water which may enter the bowl house O.

The means of arranging this adjustment of air in the bowl house O is here shown as a pipe but may be made differently in such a way that the inside of the bowl house O is brought in air communication with the surrounding atmosphere at a point and under circumstances effecting an even and undisturbed overflow of oil.

The worm wheel revolves in the direction of the arrow and, assisted by the agitators D, throws the oil from the receiver up to the top of the casing where it is caught by the tray G, the oil then passing through the bearing and returning to the casing as hereinbefore described.

Having now particularly described and ascertained the nature of the said invention and in what manner same is to be performed, I declare that what I claim is:—

1. In a lubricating device of the character described, a casing having an oil container in its lower part and a bowl house in its upper part, a revoluble vertical spindle mounted in the casing, the means for mounting said spindle including a vertical bearing at the bottom of said bowl house, said bowl house being formed to produce an inner chamber surrounding the upper end portion of said bearing, means for causing oil to pass upwardly from said oil container through said bearing and into said inner chamber of the bowl house, and means comprising two disconnected parts for returning oil from said chamber of the bowl house to the oil container in the casing, said oil returning means causing the oil to pass directly through the atmosphere outside of said casing to serve as an indicator during the return passage of the oil from said chamber to said oil container in the casing.

2. In a lubricating device of the character described, a casing having an oil container in its lower part and a bowl house at its upper end, a revoluble vertical shaft mounted in the casing, a chamber at the inner end of the upper bearing of the shaft, a splashing device in the casing for throwing the oil into said chamber, means for causing the oil to pass upward through said bearing, a chamber in the bowl house and surrounding the outer end of said upper bearing, a pipe extending from the last named chamber out through the casing, and a pipe extending into the casing and into which the first named pipe discharges, the adjacent ends of said pipes being spaced apart to afford visible indication of the flow or non-flow of oil through said first named pipe.

3. In a device of the character described, a casing having an oil chamber in its lower part, a rotary vertical spindle mounted in the casing, the means for mounting said spindle including a vertical bearing at the upper end of the casing, means for splashing oil from the lower part of the casing to said bearing, said bearing and said spindle being cooperatively formed to cause oil to pass through said bearing, and means comprising two disconnected parts extending outside of the casing for returning oil which passes through the bearing back into said casing and for affording visible indication as to whether or not oil is passing through said return means.

4. In a lubricating device of the character described, a casing having a bowl house in its upper part, a revoluble vertical spindle extending through the bottom of the bowl house centrally of the latter, said bowl house having an inner chamber surrounding said spindle, and an air pipe extending through the bottom of the bowl house into the space within the bowl house outwardly of the inner chamber, the inner end of said air tube terminating above the level of the bottom of the bowl house and below the level of the edge of said inner chamber and said air pipe being movable longitudinally to vary within limits the length of the portion of the air pipe that extends into the bowl house.

FRANTZ MORTENSEN.